United States Patent
Arai (10) Patent No.: US 10,817,767 B2
(45) Date of Patent: Oct. 27, 2020

(54) IC CARD AND PORTABLE ELECTRONIC DEVICE

(71) Applicants: KABUSHIKI KAISHA TOSHIBA, Minato-ku (JP); Toshiba Infrastructure Systems & Solutions Corporation, Kawasaki-shi (JP)

(72) Inventor: Hideaki Arai, Yokohama (JP)

(73) Assignees: KABUSHIKI KAISHA TOSHIBA, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 0 days.

(21) Appl. No.: 16/558,609

(22) Filed: Sep. 3, 2019

(65) Prior Publication Data

US 2020/0090017 A1 Mar. 19, 2020

(30) Foreign Application Priority Data

Sep. 19, 2018 (JP) ................................. 2018-174904

(51) Int. Cl.
*G06K 19/07* (2006.01)
*G06K 19/073* (2006.01)
*G06K 19/077* (2006.01)

(52) U.S. Cl.
CPC ..... *G06K 19/0709* (2013.01); *G06K 19/0704* (2013.01); *G06K 19/07354* (2013.01); *G06K 19/07775* (2013.01); *G06K 19/07779* (2013.01)

(58) Field of Classification Search
None
See application file for complete search history.

(56) References Cited

U.S. PATENT DOCUMENTS

| | | |
|---|---|---|
| 2002/0010871 A1 | 1/2002 | Thueringer et al. |
| 2011/0025264 A1 | 2/2011 | Mochida et al. |
| 2016/0071001 A1 | 3/2016 | Tsuboi et al. |
| 2016/0358061 A1 | 12/2016 | Uchida |
| 2017/0200071 A1 | 7/2017 | Sawamura |

(Continued)

FOREIGN PATENT DOCUMENTS

| | | |
|---|---|---|
| EP | 2 996 069 A1 | 3/2016 |
| EP | 3 193 460 A1 | 7/2017 |

(Continued)

OTHER PUBLICATIONS

Singaporean Search Report dated Apr. 16, 2020, in Patent Application No. 10201908139Y, citing documents AA-AB and AO-AP therein, 10 pages.

(Continued)

*Primary Examiner* — Kristy A Haupt
(74) *Attorney, Agent, or Firm* — Oblon, McClelland, Maier & Neustadt, L.L.P.

(57) ABSTRACT

According to one embodiment, an IC card includes an antenna, a charge unit, a memory, and a first processor. The charge unit is configured to be charged by a current induced electromagnetically in the antenna. The memory is configured to store processing execution information for discontinuously executing a plurality of processing. The first processor is configured to operate by a current from the charge unit, and discontinuously execute a plurality of processing by providing an interval based on the processing execution information.

9 Claims, 3 Drawing Sheets

(56) References Cited

U.S. PATENT DOCUMENTS

| | | |
|---|---|---|
| 2017/0213121 A1 | 7/2017 | Tsuboi |
| 2017/0222679 A1 | 8/2017 | Pahuja |
| 2017/0337417 A1* | 11/2017 | Lowe ................. G06K 9/00033 |
| 2018/0253587 A1* | 9/2018 | Lowe ................. G06K 9/00087 |

FOREIGN PATENT DOCUMENTS

| | | |
|---|---|---|
| JP | 2009-247125 A | 10/2009 |
| JP | 5038114 B2 | 10/2012 |
| JP | 2012-238126 A | 12/2012 |
| JP | 2017-196319 A | 11/2017 |
| JP | 2017-532683 A | 11/2017 |
| KR | 2003-0093168 A | 12/2003 |

OTHER PUBLICATIONS

Extended European Search Report dated Feb. 11, 2020 in European Patent Application No. 19195335.5, citing documents AO and AP therein, 8 pages.

* cited by examiner

IC CARD AND PORTABLE ELECTRONIC DEVICE

CROSS-REFERENCE TO RELATED APPLICATIONS

This application is based upon and claims the benefit of priority from Japanese Patent Application No. 2018-174904, filed Sep. 19, 2018, the entire contents of which are incorporated herein by reference.

FIELD

Embodiments described herein relate generally to an IC card and a portable electronic device.

BACKGROUND

In recent years, an IC card that includes an integrated circuit (IC) chip is widespread. Since the IC card is of a portable size, it is sometimes called a portable electronic device. Due to its smallness, it may also be considered as a typical example of a portable electronic device. The IC card is not only used for credit cards, commuter passes, and other settlements of commercial transactions, but is also used as identification cards (IDs), such as employee IDs, membership IDs, and insurance IDs, in various fields.

The IC card may be roughly divided into a contact type and a non-contact type. Since the contact type IC card operates by power fed by a contact terminal, it can obtain a sufficient supply current from a terminal of an IC card reader/writer, etc. On the other hand, since the non-contact type IC card operates by power supplied in a non-contact manner via an antenna, there is a possibility that a small amount of current is obtained from a terminal, or that, if there is distance between the terminal and the card, sufficient power for operation may not be obtained. In such case, a method of incorporating a smoothing capacitor into the IC card to stabilize operations may be considered. Power supply may also be considered to be aided using an electrical double-layer capacitor (EDLC) or a secondary battery, etc.

However, unless the current is almost full, the smoothing capacitor may be subject to operation error in mid-course. Furthermore, even in the case of using a battery charger such as the EDLC or the secondary battery, in the case where the processing cannot be accomplished by a fully charged current, the processing will be stopped in mid-course, and become an operation error.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

In the following, an IC card system according to an embodiment will be explained with reference to the drawings.

In general, according to one embodiment, an IC card includes an antenna, a charge unit, a memory, and a first processor. The charge unit is configured to be charged by a current induced electromagnetically in the (coil-shaped) antenna. The memory is configured to store processing execution information for discontinuously executing a plurality of processing. The first processor is configured to operate by a current from the charge unit, and discontinuously execute a plurality of processing by providing an interval based on the processing execution information.

Figure 1:
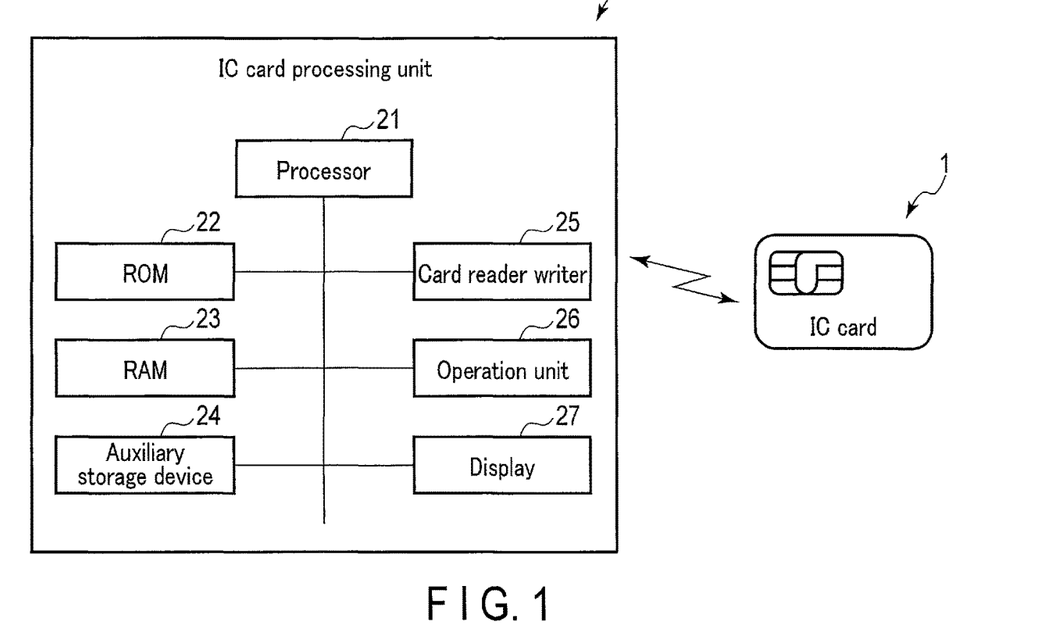
FIG. 1 is a block diagram showing an example of an IC card system according to an embodiment.

FIG. 1 is a block diagram showing an example of an IC card system according to an embodiment. As shown in FIG. 1, the IC card system comprises an IC card 1 and an IC card processing unit 2.

The IC card 1 is, for example, a card in the size of 85.6 mm×54 mm×0.76 mm, and is a portable electronic device assumed to be portable for a user. Furthermore, the IC card may also be referred to as a smart card, etc. The IC card 1 is a non-contact type IC card that obtains operating power by non-contact power supply. That is, when the IC card 1 enters a communication area (magnetic field area) of a card reader writer of the IC card processing unit 2, an antenna (coil) of the IC card 1 is activated by electromagnetic induction, and is operated by the generated current. In the present embodiment, an IC card referred to as a combination type that supports both functions of a non-contact type that communicates with the IC card processing unit 2 in a non-contacting manner, and a contact type that communicates with the IC card processing unit 2 in a contacting manner will be explained. The operation and processing explained in the present embodiment can also be applied to the non-contact type IC card.

The IC card processing unit 2 is installed at entrances and exits of facilities such as shops or stations, communicates with the IC card 1 that is held up by a user, and transmits information to the IC card 1, or receives information from the IC card 1. A number of IC cards 1 are circulated in the market, and the IC card processing unit 2 installed at each location communicates with the IC card 1 that is held up by the user.

Here, a schematic configuration of the IC card processing unit 2 will be explained. The IC card processing unit 2 comprises a processor 21, a read-only memory (ROM) 22, a random-access memory (RAM) 23, an auxiliary storage device 24, a card reader writer 25, an operation unit 26, and a display 27, etc.

The processor 21 corresponds to a central portion of a computer that executes various types of processing, such as calculation and control necessary for operating the IC card processing unit 2, based on a program stored at least in one of the ROM 22 and the auxiliary storage device 24. The processor 21 is, for example, a central processing unit (CPU) or a micro processing unit (MPU). The IC card processing unit 2 may also combine two or more processors 21 and execute various types of processing by having these two or more processors cooperate with each other.

For example, by executing the program, the processor 21 has a function of transmitting a command to the IC card 1 by the card reader writer 25, and a function of executing processing based on data such as a response received from the IC card 1, etc. By these functions, the processor 21 transmits data that input to the operation unit 26, etc. or a write command that includes write data to the IC card 1 via the card reader writer 25.

The ROM 22 is a nonvolatile memory dedicated to reading that corresponds to a main storage portion of the processor 21 corresponding to a computer. The ROM 22 stores a program, such as an operating system or an application software. The ROM 22 also stores data, etc. that the processor 21 uses upon performing various types of processing.

The RAM 23 is a nonvolatile memory that corresponds to a main storage portion of the processor 21 corresponding to a computer. The RAM 23 is utilized as a so-called work area for storing data temporarily used by the processor 21 upon performing various types of processing.

The auxiliary storage device 24 corresponds to an auxiliary storage portion of the processor 21 corresponding to a computer. The auxiliary storage device 24 is, for example, an electric erasable programmable read-only memory (EE-PROM) (Trademark), a hard disk drive (HDD), or a solid state drive (SSD). In some cases, the auxiliary storage device 24 stores a part of or all of the above-mentioned programs. Furthermore, the auxiliary storage device 24 stores data to be used by the processor 21 when performing various types of processing, data generated by the various types of processing performed by the processor 21, or various setting values, etc.

The card reader writer 25 is an interface device for transmitting/receiving data to/from the IC card 1. The card reader writer 25 comprises an antenna, a contact terminal, and a communication controller, etc., communicates with a combination type or non-contact type IC card 1 (the antenna of the IC card 1) in a non-contacting manner via the antenna, and communicates with the combination type IC card 1 (the contact terminal of the IC card) by physical and electrical connection via the contact terminal. As mentioned above, in the present embodiment, a case in which a combination type card is used is explained; however, in the case of a card reader writer 25 for a non-contact type card, a contact terminal is not provided.

The operation unit 26 receives an input instruction from an operator of the IC card processing unit 2. The operation unit 26 transmits input data corresponding to the received input instruction to the processor 21. The operation unit 26 is, for example, a keyboard, a ten key, and a touch panel.

The display 27 is a display device that displays various information under the control of the processor 21. The display 27 is, for example, a liquid crystal monitor. For example, the display 27 may be formed integrally with the operation unit 26.

Figure 2:
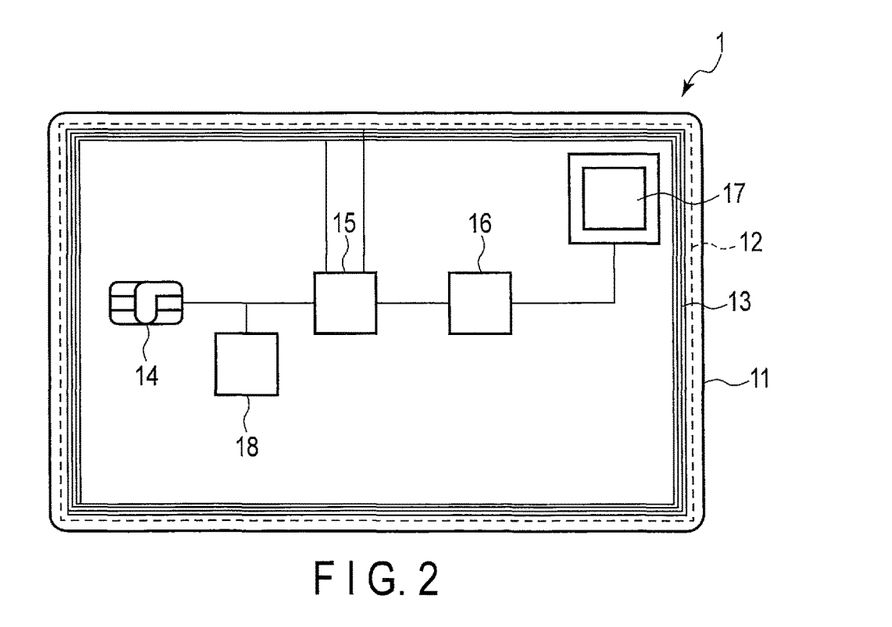
FIG. 2 is a top view showing an example of an IC card according to the embodiment.
Figure 3:
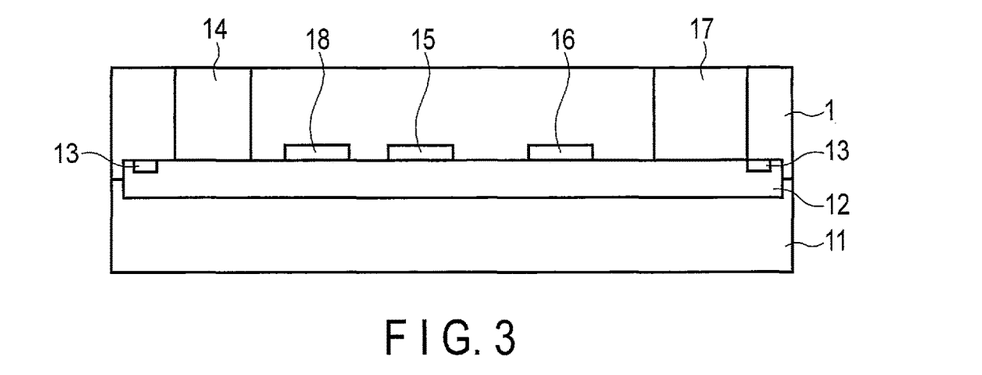
FIG. 3 is a cross-sectional view showing an example of the IC card according to the embodiment.

FIG. 2 is a top view showing an example of an IC card according to the embodiment. Furthermore, FIG. 3 is a cross-sectional view showing an example of the IC card according to the embodiment. As shown in FIG. 2 and FIG. 3, the IC card 1 may be configured by, such as, a plastic card base material 11. An electronic board 12 is included in the card base material 11. On the electronic board 12 is provided an antenna (coil) 13, a contact terminal 14, a secure IC chip 15, an image processing IC chip 16, a fingerprint sensor 17, and a charge unit 18. In the present embodiment, the IC card 1 comprising two IC chips will be explained; however, the IC card may comprise three or more IC chips, or comprise one IC chip.

When entering the communication area (magnetic field area) of the antenna of the card reader writer 25, the antenna 13 of the IC card 1 is activated by electromagnetic induction, and generates a current. The antenna 13 is connected to the secure IC chip 15, the contact terminal 14 is connected to the secure IC chip 15, the secure IC chip 15 is connected to the image processing IC chip 16, and the image processing IC chip 16 is connected to the fingerprint sensor 17.

For example, the secure IC chip 15 operates as a master IC chip, and the image processing IC chip 16 operates as a slave IC chip. The secure IC chip 15 controls communication with the card reader writer 25. The secure IC chip 15 also executes fingerprint authentication processing, etc. The image processing IC chip 16 executes image acquisition processing for acquiring a read fingerprint image output from the fingerprint sensor 17, and image processing for extracting a plurality of features from the read fingerprint image, and generating a read fingerprint image template based on the plurality of features.

The fingerprint sensor 17 is a capacitance, an optical, or an ultrasonic sensor, reads a fingerprint from a finger placed on the fingerprint sensor 17, and outputs a fingerprint image obtained by the reading result to the image processing IC chip 16. The sensing scheme of the fingerprint sensor 17 is not limited to the above, and may be another sensing scheme.

The charge unit 18 includes a chargeable and dischargeable device, such as an EDLC or a secondary battery, and is charged by the current generated at the antenna 13. Furthermore, the current discharged from the charge unit 18 is supplied to the secure IC chip 15 and the image processing IC chip 16, and the secure IC chip 15 and the image processing IC chip 16 operate by the current discharged from the charge unit 18. For example, the charge unit 18 and the image processing IC chip 16 are connected through the secure IC chip 15 (interface 151 and interface 161), and the current from the charge unit 18 is supplied to the image processing IC chip 16 via the secure IC chip 15. Alternatively, the charge unit 18 may be connected to the secure IC chip 15 (a first charge unit), and a second charge unit may be connected to the image processing IC chip 16. The thickness of the IC card 1 is approximately 0.76 mm, and the capacity of the charge unit 18 mounted on the IC card 1 is, for example, approximately several mFs to several tens of mFs in the case of the EDLC. This capacity can be expanded by widening the condenser area, or by providing a plurality of charge units. Furthermore, the charge unit 18 detects the residual capacity in real time, and notifies the residual capacity to the secure IC chip 15 and the image processing IC chip 16.

When using the IC card 1, the user places a finger on the fingerprint sensor 17 and holds or inserts the IC card 1 above or into the card reader writer 25. The antenna (coil) of the IC card 1 is activated by electromagnetic induction, and the fingerprint sensor 17 reads the fingerprint of the fingertip by using the generated current, and outputs a fingerprint image. The secure IC chip 15 and the image processing IC chip 16 of the IC card 1 cooperate with each other to execute the fingerprint authentication processing based on the fingerprint image.

Figure 4:
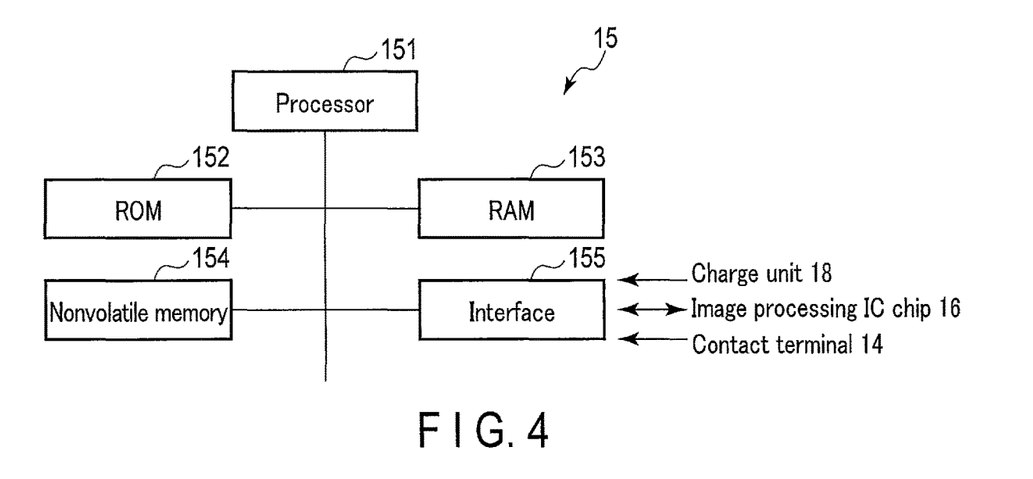
FIG. 4 is a block diagram showing a schematic configuration of a secure IC chip of the IC card according to the embodiment.

FIG. 4 is a block diagram showing a schematic configuration of the secure IC chip of the IC card according to the embodiment. As shown in FIG. 4, the secure IC chip 15 comprises a processor 151, a ROM 152, a RAM 153, a nonvolatile memory 154, and an interface 155, etc.

The processor 151 corresponds to a central portion of a computer that executes various types of processing, such as calculation and control necessary for operating the secure IC chip 15, based on a program stored at least in one of the ROM 152 and the nonvolatile memory 154. The processor 151 is, for example, a central processing unit (CPU) or a micro processing unit (MPU). The secure IC chip 15 may also combine two or more processors 151 and execute various types of processing by the cooperation between these two or more processors.

For example, by executing the program, the processor 151 has a function of interpreting the command transmitted from the card reader writer 25 and received via the antenna 13 to execute processing based on the command, and a function of transmitting a response to the card reader writer 25 by the antenna 13. The processor 151 also executes card authentication processing based on a card authentication command.

The processor 151 also senses the residual capacity notified from the charge unit 18 via the interface 155. Specifically, a voltage sensor IC or a current sensor IC (not shown) is used to sense the residual capacity, voltage, or current of the charge unit 18, and enable the processor 151 to sense such value. The processor 151 also discontinuously executes a plurality of processing based on processing execution information stored in the nonvolatile memory 154. In order to prevent a processing error caused by failure to end processing due to the lack of current in mid-course of a series of processing, the processor 151 discontinuously executes a plurality of processing in accordance with the situation. That is, based on the processing execution information, in accordance with the situation, the processor 151 provides an interval in which processing is not executed during the processing, and restores the capacity of the charge unit 18 by the current obtained by the non-contact power supply in this interval. The execution of discontinuous processing will be explained in detail later on.

The ROM 152 is a nonvolatile memory dedicated to reading that corresponds to a main storage portion of the processor 151. The ROM 152 stores a program, such as an operating system or an application software. The ROM 152 also stores data, etc. that the processor 151 uses upon performing various types of processing.

The RAM 153 is a nonvolatile memory that corresponds to a main storage portion of the processor 151. The RAM 153 is utilized as a so-called work area for storing data temporarily used by the processor 151 upon performing various types of processing.

The nonvolatile memory 154 corresponds to an auxiliary storage portion of the processor 151. The nonvolatile memory 154 is, for example, EEPROM. In some cases, the nonvolatile memory 154 stores a part of or all of the above-mentioned programs. Furthermore, the nonvolatile memory 154 stores data to be used by the processor 151 when performing various types of processing, data generated by the various types of processing performed by the processor 151, or various setting values, etc.

Furthermore, the nonvolatile memory 154 stores the processing execution information for discontinuously executing a plurality of processing executed by the processor 151. For example, the processing execution information includes a voltage threshold and a current threshold for determining the residual capacity of the charge unit 18. The processing execution information also includes at least one of the command information to be the target of the discontinuous processing and progress information indicating the progress of each processing, etc. The processing execution information also includes information (time) indicating an interval of a plurality of processing executed discontinuously. The information indicating this interval is set in advance, and is determined based on at least one of the capacity of the charge unit 18 mounted on the IC card 1, a current value (for example, an average value) obtained by non-contact power supply, and a consumption current (for example, an average value) of each processing. As that indirectly indicating the current amount, the interval time may be determined by sensing the voltage.

Furthermore, the nonvolatile memory 154 registers a registered fingerprint image template for the fingerprint authentication. The nonvolatile memory 154 may register a plurality of registered fingerprint image templates obtained by reading the fingertip of one finger a number of times, or may register a plurality of registered fingerprint image templates obtained by reading fingertips of a plurality of fingers once or a number of times. The registered fingerprint image template is generated based on a plurality of features extracted from the fingerprint image.

The interface 155 communicates with the image processing IC chip 16 and receives the read fingerprint image template generated by the image processing IC chip 16. The interface 155 also receives a command, etc. transmitted from the contact terminal 14. The image processing IC chip 16 may also transmit fingerprint image information in a state prior to becoming the read fingerprint image template to the secure IC chip 15 through the interface 155, and have a fingerprint image template itself generated at the secure IC chip.

Figure 5:
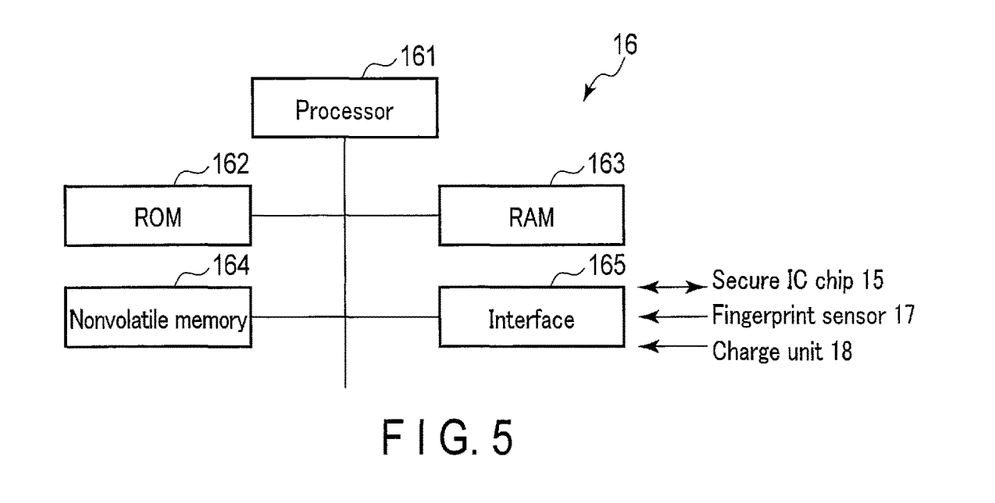
FIG. 5 is a block diagram showing a schematic configuration of an image processing IC chip of the IC card according to the embodiment.

FIG. 5 is a block diagram showing a schematic configuration of an image processing IC chip of the IC card according to the embodiment. As shown in FIG. 5, the secure IC chip 16 comprises a processor 161, a ROM 162, a RAM 163, a nonvolatile memory 164, and an interface 165, etc. The basic configurations of each part of the image processing IC chip 16 and each part of the secure IC chip 15 are substantially the same. Therefore, the differences thereof will be mainly explained, and explanations on the common portions will be omitted.

For example, the processor 161 executes image acquisition processing for acquiring the read fingerprint image output from the fingerprint sensor 17, and image processing for extracting a plurality of features from the read fingerprint image, and generating the read fingerprint image template based on the plurality of features. The interface 165 communicates with the fingerprint sensor 17, and communicates with the secure IC chip 15. As mentioned earlier, the image processing IC chip 16 may also transmit fingerprint image information in a state prior to becoming the read fingerprint image template to the secure IC chip 15 through the interface 155, and have a fingerprint image template itself generated at the secure IC chip.

The processor 161 also senses the residual capacity notified from the charge unit 18 via the interface 165 or the secure IC chip 15. Specifically, a voltage sensor IC or a current sensor IC (not shown) is used to sense the residual capacity, voltage, or current of the charge unit 18, and enable the processor 161 to sense such value. The processor 161 also discontinuously executes a plurality of processing based on processing execution information stored in the nonvolatile memory 164. In order to prevent a processing error caused by failure to end processing due to the lack of current in mid-course of a series of processing, the processor 161 discontinuously executes a plurality of processing in accordance with the situation. That is, based on the processing execution information, and in accordance with the situation, the processor 161 provides an interval in which processing is not executed between each processing, and restores the capacity of the charge unit 18 by the current obtained by the non-contact power supply during this interval. The execution of the discontinuous processing will be explained in detail later on.

The nonvolatile memory 164 stores the processing execution information for discontinuously executing a plurality of processing executed by the processor 161. For example, the processing execution information includes a voltage threshold and a current threshold for determining the residual capacity of the charge unit 18. The processing execution information also includes at least one of the command information to be the target of the discontinuous processing and progress information indicating the progress of each processing, etc. The processing execution information also includes information (time) indicating an interval of a plurality of processing to be executed discontinuously. The determining method of the interval of processing is the same as the determining method performed by the processor 151 of the secure IC chip 15.

Now, measures to be taken for an operation error caused by the lack of current will be explained.

In order to operate the IC card 1 by the non-contact power supply (in the case where a current from the charge unit 18 is not utilized), processing will be limited to that requiring a consumption current equal to or less than the current obtained by the non-contact power supply. Since the IC card 1 comprises the charge unit 18, the current from the charge unit 18 charged by the non-contact power supply allows to execute processing that requires a consumption current exceeding the current obtained by the non-contact power supply. Furthermore, based on the processing execution information, the IC card 1 can prevent an operation error caused by the lack of current from the charge unit 18 from occurring by providing an execution interval in accordance with the situation and discontinuously executing a plurality of processing, or by dividing the processing into a plurality of processing sets and discontinuously executing these processing sets. For example, the plurality of processing correspond to a plurality of commands, or are obtained by dividing the processing corresponding to one command into a plurality of processing sets. Since the charge unit 18 can be charged by the non-contact power supply and have the residual capacity restored during a period in which processing is not executed (that is, an interval between each processing), the IC card 1 can prevent an operation error caused by the lack of current from occurring. By setting the length of the interval between each processing appropriately, delay in processing can be prevented, and, by sufficiently restoring the residual capacity, the processing can be accomplished even when the load of processing is heavy (processing requiring large current consumption).

Based on the processing execution information stored in the nonvolatile memory 154, the processor 151 of the secure IC chip 15 discontinuously executes a plurality of processing by providing an execution interval in accordance with the situation. For example, the processor 151 executes first processing, and, at a timing where the residual capacity of the charge unit exceeds the current threshold, executes second processing. Alternatively, the processor 151 executes the first processing, and, after a predetermined elapsed time, executes the second processing. The predetermined time is set by information indicating the interval included in the processing execution information. The predetermined time may be a fixed time, or may be a variable time that is set based on at least one of the residual capacity of the charge unit 18 and the current value obtained by the non-contact power supply.

Similarly, based on the processing execution information stored in the nonvolatile memory 164, the processor 161 of the image processing IC chip 16 discontinuously executes a plurality of processing by providing an execution interval in accordance with the situation. For example, the processor 161 executes the first processing, and, at a timing where the residual capacity of the charge unit exceeds the current threshold, executes the second processing. Alternatively, the processor 161 executes the first processing, and, after a predetermined elapsed time, executes the second processing. The predetermined time is set by information indicating the interval included in the processing execution information. For example, the image processing IC chip 16 executes image processing that includes the image acquisition processing for acquiring the read fingerprint image output from the fingerprint sensor 17, and feature extraction processing that extracts a plurality of features from the read fingerprint image and generates the read fingerprint image template; however, since the load of the image acquisition processing and the feature extraction processing is heavy, the consumption current tends to become large. Based on the processing execution information, the processor 161 provides the execution interval in accordance with the situation, and discontinuously executes the image acquisition processing and the feature extraction processing included in the image processing, or divides the image acquisition processing and the feature extraction processing included in the image processing, and discontinuously executes the divided image acquisition processing and feature extraction processing. In the above manner, the processing can be accomplished by sufficiently restoring the residual capacity even when the load of the processing is heavy (processing requiring large current consumption).

Figure 6:
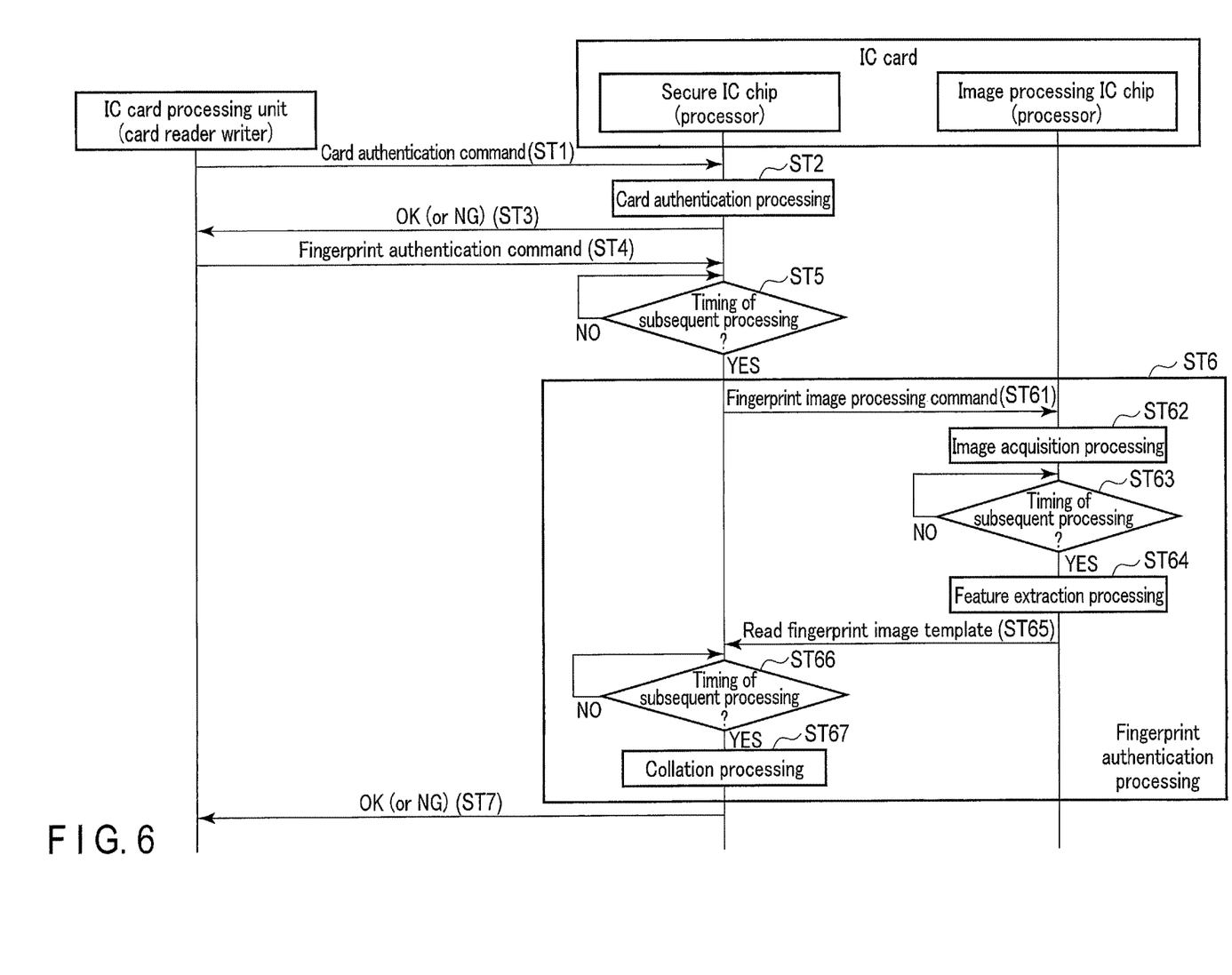
FIG. 6 shows an example of operation sequences of the IC card processing unit and the IC card, and an operation sequence inside the IC card.

FIG. 6 shows an example of operation sequences of the IC card processing unit and the IC card, and an operation sequence inside the IC card. In the present embodiment, a case in which the two IC chips (secure IC chip 15 and image processing IC chip 16) of the IC card 1 cooperate with each other to execute authentication processing (card authentication processing and fingerprint authentication processing), and discontinuous processing is applied to such authentication processing will be mainly explained. The IC card 1 may execute the authentication processing by one IC chip and apply discontinuous processing to such authentication processing.

The card reader writer 25 of the IC card processing unit 2 outputs a polling signal and waits for a response from the IC card 1. When a user holds the IC card 1 above the card reader writer 25, and the antenna 13 of the IC card 1 enters the communication area of the card reader writer 25, the antenna 13 of the IC card 1 is activated by electromagnetic induction, and the IC card 1 operates by obtaining an operating current. The processor 151 of the secure IC chip 15 senses the polling signal received via the antenna 13, and returns a response signal via the antenna 13.

Here, a case in which the discontinuous processing is applied to command processing from the IC card processing unit 2 that is an external device will be explained. For example, the IC card 1 receives a plurality of commands from the card reader writer 25 of the IC card processing unit 2, and executes a plurality of processing corresponding to the plurality of commands in sequence. A case of applying the discontinuous processing to such plurality of processing will be explained.

The card reader writer 25 receives the response signal from the IC card 1, and transmits a card authentication command (step ST1). The processor 151 senses the card authentication command received via the antenna 13, executes the card authentication processing based on the card authentication command (step ST2), and returns the card authentication result that indicates a card authentication success (OK) or a card authentication failure (NG) via the antenna 13 (step ST3). In the case where the card authentication is a success, the processor 151 records the progress of the card authentication processing (card authentication completion) on the progress information included in the processing execution information.

For example, in the case where the residual capacity of the charge unit 18 is higher than the capacity threshold, the processor 151 executes the card authentication processing based on the card authentication command. In the case where the residual capacity of the charge unit 18 is equal to or lower than the capacity threshold, the processor 151 may wait for the residual capacity to become higher than the capacity threshold and execute the card authentication processing. The capacity threshold may also be set so that a state in which the residual capacity is higher than the capacity threshold is a fully charged state with respect to the performance of the charge unit 18. This can reduce the risk of failing to execute card authentication processing due to the lack of current.

When the card reader writer 25 receives the card authentication result indicating the card authentication success (OK) from the IC card 1, a fingerprint authentication command is transmitted (step ST4). When receiving the card authentication result indicating the card authentication failure (NG) from the IC card 1, the processing ends at this point.

The processor 151 senses the fingerprint authentication command received via the antenna 13 and executes the fingerprint authentication processing based on the fingerprint authentication command. Here, based on the processing execution information stored in the nonvolatile memory 154, the processor 151 discontinuously executes the foregoing processing (card authentication processing) and the subsequent processing (fingerprint authentication processing) (step ST6). Furthermore, after checking the progress (completion) of the card authentication processing based on the progress information included in the processing execution information, the processor 151 executes the fingerprint authentication processing, and records the progress of the fingerprint authentication processing in the progress information.

For example, the fingerprint authentication processing includes a plurality of processing such as image acquisition processing, feature extraction processing, and collation processing. Here, processing is assumed to be executed in the order of the image acquisition processing, the feature extraction processing, and the collation processing. Based on the processing execution information, the processor 151 provides the execution interval in accordance with the situation, and discontinuously executes the foregoing processing (card authentication processing) and the subsequent processing (a primary image acquisition processing included in the fingerprint authentication processing). That is, when the processor 151 accomplishes the foregoing processing (card authentication processing) and reaches a timing of the subsequent processing after the elapse of the execution interval (step ST5, YES), the processor 151 executes the subsequent processing (the primary image acquisition processing included in the fingerprint authentication processing) by the image processing IC chip.

For example, the processor 151 executes the discontinuous processing set forth in at least one of the following discontinuous processing 1 to discontinuous processing 4 by the image processing IC chip. By executing the discontinuous processing, the risk of failing to execute the fingerprint authentication processing due to the lack of current can be reduced. Since the load of the fingerprint authentication processing is heavy, and current consumption is large, by executing the discontinuous processing to provide an opportunity for the charge unit 18 to be charged before executing the fingerprint authentication processing, the risk of failing to execute the fingerprint authentication processing due to the lack of current can be reduced.

(Discontinuous processing 1) The processor 151 accomplishes the card authentication processing, and, based on the processing execution information, provides an execution interval in accordance with the situation, and transmits the fingerprint image processing command to the image processing IC chip 16 for the image processing IC chip 16 to execute the image acquisition processing and the feature extraction processing.

(Discontinuous processing 2) The processing execution information includes command information that becomes the target of the discontinuous processing. In the case where the command information that becomes the target of the discontinuous processing includes the fingerprint authentication command, the processor 151 accomplishes the card authentication processing, provides an execution interval (for example, after waiting for the residual capacity to exceed the capacity threshold), and transmits the fingerprint image processing command to the image processing IC chip 16 for the image processing IC chip 16 to execute the image acquisition processing and the feature extraction processing. Furthermore, by registering the execution interval by each command in the nonvolatile memory 154, discontinuous processing can be realized by the execution interval in accordance with the load of each command that is comprehended in advance. In other words, the discontinuous processing can be realized by a variable execution interval in accordance with the command. In this manner, the discontinuous processing can be realized in a further efficient manner without unnecessarily extending the processing time.

(Discontinuous processing 3) In the case where the card authentication processing is accomplished, and the residual capacity included in the processing execution information is equal to or lower than the capacity threshold, the processor 151 transmits the fingerprint image processing command to the image processing IC chip 16 based on a timing at which the residual capacity exceeds the capacity threshold (by providing an execution interval based on the processing execution information), for the image processing IC chip 16 to execute the image acquisition processing and the feature extraction processing. Furthermore, by registering the execution interval by each residual capacity in the nonvolatile memory 154, discontinuous processing can be realized by the execution interval in accordance with the residual capacity. In other words, the discontinuous processing can be realized by a variable execution interval in accordance with the residual capacity. In this manner, the discontinuous processing can be realized in a further efficient manner without unnecessarily extending the processing time.

(Discontinuous processing 4) In the case where the card authentication processing is accomplished, and the current value obtained by the non-contact power supply is equal to or lower than the current threshold, the processor 151 transmits the fingerprint image processing command to the image processing IC chip 16 based on a timing at which the current value exceeds the current threshold (by providing an execution interval based on the processing execution information), for the image processing IC chip 16 to execute the image acquisition processing and the feature extraction processing. Furthermore, by registering the execution interval by each current value obtained by the non-contact power supply in the nonvolatile memory 154, the discontinuous processing can be realized by the execution interval in accordance with the current value. In other words, the discontinuous processing can be realized by a variable execution interval in accordance with the current value. In this manner, the discontinuous processing can be realized in a further efficient manner without unnecessarily extending the processing time.

In the case where the IC card 1 executes a plurality of processing (card authentication processing and fingerprint authentication processing) by one IC chip, the IC chip provides an execution interval in accordance with the situation based on the processing execution information, and discontinuously executes a plurality of processing corresponding to a plurality of commands.

Now, a case in which the discontinuous processing is applied to the inner command processing of the IC card 1 will be explained. For example, in the case where the secure IC chip 15 of the IC card 1 transmits a command to the image processing IC chip 16, the image processing IC chip 16 receives this command and executes a plurality of processing corresponding to this command in sequence. Here, a case in which the discontinuous processing is applied to such plurality of processing will be explained.

The processor 151 of the secure IC chip 15 transmits the fingerprint image processing command to the image processing IC chip 16 (step ST61), and the processor 161 of the image processing IC chip 16 senses the fingerprint image processing command and executes the image acquisition processing for acquiring an image output from the fingerprint sensor 17 (step ST62). The processor 161 records the progress of the image acquisition processing in the progress information included in the processing execution information stored in the nonvolatile memory 164.

Subsequently, based on the processing execution information stored in the nonvolatile memory 164, the processor 161 executes the foregoing processing (image acquisition processing) and the subsequent processing (feature extraction processing) discontinuously by providing an execution interval in accordance with the situation. That is, when the processor 161 accomplishes the foregoing processing (image acquisition processing) and reaches a timing of the subsequent processing after the elapse of the execution interval (step ST63, YES), the processor 161 executes the subsequent processing (feature extraction processing) (step ST64). For example, the subsequent processing (feature extraction processing) is executed based on a timing at which the residual capacity of the charge unit 18 exceeds the capacity threshold. After checking the progress (completion) of the image acquisition processing based on the progress information included in the processing execution information, the processor 161 executes the feature extraction processing, and records the progress of the feature extraction processing in the progress information. This enables a plurality of processing to be executed correctly. By the feature extraction processing, the processor 161 extracts a plurality of features from the read fingerprint image output from the fingerprint sensor 17, generates the read fingerprint image template based on the plurality of features, and transmits the read fingerprint image template to the secure IC chip 15 (step ST65).

Similarly to at least one of the discontinuous processing of Discontinuous processing 1 to Discontinuous processing 4 executed by the processor 151, the discontinuous processing executed by the processor 161 is also controlled based on the processing execution information. Therefore, unless the fingerprint image processing command is a command targeted for the discontinuous processing, the discontinuous processing will not be applied. Furthermore, the execution interval of the discontinuous processing may be variably controlled based on the residual capacity of the charge unit 18 or the current value obtained by the non-contact power supply. The effect of the discontinuous processing executed by the processor 161 is the same as that of the discontinuous processing executed by the processor 151.

Furthermore, in the case where one fingerprint image processing command instructs the execution of the image acquisition processing and the feature extraction processing, the processor 161 divides the image acquisition processing and the feature extraction processing corresponding to the one fingerprint image processing command, and discontinuously executes the image acquisition processing and the feature extraction processing. In the case where the secure IC chip 15 transmits a first command corresponding to the image acquisition processing, and, subsequently, transmits a second command corresponding to the feature extraction processing, the division processing is not essential, and the processor 161 discontinuously executes the image acquisition processing and the feature extraction processing corresponding to these first and second commands.

The processor 151 of the secure IC chip 15 receives the read fingerprint image template from the image processing IC chip 16, provides an execution interval in accordance with the situation based on the processing execution information stored in the nonvolatile memory 164, and discontinuously executes the foregoing processing (feature extraction processing) and the subsequent processing (collation processing). That is, when the processor 151 accomplishes the foregoing processing (feature extraction processing) and reaches a timing of the subsequent processing after the elapse of the execution interval (step ST66, YES), the processor 151 executes the subsequent processing (collation processing) (step ST67). For example, the subsequent processing (collation processing) is executed based on a timing at which the residual capacity of the charge unit 18 exceeds the capacity threshold. Here, as well, the processor 151 executes Discontinuous processing 4 in the same manner as the discontinuous processing of at least one of Discontinuous processing 1 to Discontinuous processing 4. Furthermore, the processor 151 records the progress of the collation processing in the progress information included in the processing execution information. In the collation processing, the processor 151 collates the registered fingerprint image template that is registered in the nonvolatile memory 154 with the received read fingerprint image template, calculates the degree of similarity, and, based on the calculation result of the degree of similarity, determines the fingerprint authentication success or the fingerprint authentication failure. The processor 151 returns the fingerprint collation result indicating the fingerprint authentication success or the fingerprint authentication failure to the fingerprint authentication command from the card reader writer 25 (step ST4) (step ST7).

The above explains a case in which the discontinuous processing is applied to each of the two IC chips of the IC card 1; however, the case is not limited thereto. For example, the discontinuous processing may be applied to one of the IC chips, and may not be applied to the other IC chip. For example, the discontinuous processing may be applied to an IC chip that handles image processing with a heavy load and large current consumption, and may not be applied to an IC chip that does not handle image processing.

Furthermore, the above explains that, in a case where one of the two IC chips of the IC card 1 functions as a master and handles processing of an external command from an external device, the discontinuous processing is applied to the processing of this external command. In a case where the other IC chip functions as a slave and handles processing of an internal command from the master, the discontinuous processing is applied to the processing of this internal command. However, the case is not limited thereto. For example, in the case where one of the IC chips of the IC card 1 handles the image acquisition processing, the feature extraction processing, and the collation processing, etc., the discontinuous processing may be applied to such processing executed by the one IC chip.

A summary of the discontinuous processing explained above is as follows.

(1) Based on the processing execution information, the IC chip of the IC card 1 discontinuously executes a plurality of processing corresponding to a plurality of external commands from the external device, or a plurality of divided processing sets which are obtained by dividing the processing corresponding to one external command into a plurality of processing sets. Furthermore, based on the processing execution information, the IC chip of the IC card 1 discontinuously executes a plurality of processing corresponding to the internal command from the other IC chip inside the IC card 1, or a plurality of divided processing sets which are obtained by dividing the processing corresponding to one internal command into a plurality of processing sets. This can reduce the risk of failing to execute processing due to the lack of current.

(2) A specific command that corresponds to the processing with a heavy load such as the feature extraction processing is registered in the processing execution information. The IC chip of the IC card 1 discontinuously executes a plurality of processing corresponding to the specific command. This allows the processing with a heavy load to be a target of the discontinuous processing.

(3) The IC chip of the IC card 1 records the progress of each processing as the progress information. In the case of executing a plurality of processing by providing an execution interval, the IC chip is able to execute each processing in a correct processing order without omission by referring to the progress information. That is, by referring to the progress information, the IC chip is able to resume the subsequent processing while confirming the processing that has been performed among the plurality of processing.

(4) When executing the plurality of processing, the IC chip of the IC card 1 executes the subsequent processing at a timing where the residual capacity of the charge unit exceeds the capacity threshold (after being fully charged) based on the processing execution information. In this manner, the plurality of processing can be executed by repeating charge and discharge in the flow of, such as, fully charged, discharged (processing 1), fully charged, discharged (processing 2), . . . , fully charged, and discharged (processing X), which allows the risk of failing to execute processing due to lack of current to be reduced.

In the present embodiment, a case in which discontinuous processing is applied by focusing on the image processing of the read fingerprint image read by the fingerprint sensor 17 is explained. However, this is not limited to the fingerprint sensor 17, and the discontinuous processing can be applied to a plurality of processing by a high-performance IC card that comprises a sensor, a display, and a button as in other camera elements.

According to the present embodiment, the following requests can be met.

For example, since the thickness of the IC card is approximately 0.76 mm, the capacity of the battery charger mounted on such thin IC card is small, and may not be able to accomplish the processing depending on the load of the processing (current consumption). In the future, also in consideration of pursuing a highly-advanced IC card, a technique that accomplishes processing without causing an operation error to occur even when the processing load is heavy and causes current consumption to increase is desired.

According to the present embodiment, an IC card and a portable electronic device that can reduce the risk of processing failure caused by lack of current can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A portable electronic device comprising:
an antenna;
a charge unit configured to be charged by a current induced electromagnetically in the antenna;
a memory configured to store processing execution information for discontinuously executing a plurality of processing; and
a first processor configured to operate by a current from the charge unit, sense a residual capacity, a voltage, or a current of the charge unit, and discontinuously execute a plurality of processing by providing an interval based on the processing execution information,
wherein the processing execution information includes at least one of: a threshold, command information to be a target of discontinuous processing, progress information indicating progress of each processing; and the processing execution information includes a time interval of a plurality of processing determined by the residual capacity of the charge unit and a current value or a voltage value obtained by a non-contact power supply, and
the threshold relates to the residual capacity, the voltage, or the current of the charge unit.

2. The portable electronic device according to claim 1, wherein the first processor is configured to discontinuously execute a plurality of processing in accordance with a plurality of commands.

3. The portable electronic device according to claim 1, wherein the first processor is configured to divide one processing into a plurality of processing sets, and discontinuously execute the plurality of divided processing sets.

4. The portable electronic device according to claim 1, comprising a second processor configured to operate by a current from the charge unit, wherein the first processor is configured to discontinuously execute a plurality of processing in accordance with a command from the second processor.

5. The portable electronic device according to claim 1, wherein
the plurality of processing includes first processing and second processing, and
the first processor is configured to execute the second processing after executing the first processing based on a timing at which a residual capacity of the charge unit exceeds the threshold.

6. The portable electronic device according to claim 1, wherein the first processor is configured to record progress information indicating progress of a plurality of processing in the memory.

7. The portable electronic device according to claim 1, wherein the first processor is configured to discontinuously execute a plurality of image processing.

8. The portable electronic device according to claim 7, comprising a fingerprint sensor, wherein
the first processor is configured to discontinuously execute a plurality of image processing based on an image from the fingerprint sensor.

9. An IC card comprising:
an antenna;
a charge unit configured to be charged by a current induced electromagnetically in the antenna;
a memory configured to store processing execution information for discontinuously executing a plurality of processing; and
a first processor configured to operate by a current from the charge unit, sense a residual capacity, a voltage, or a current of the charge unit, and discontinuously execute a plurality of processing by providing an interval based on the processing execution information,
wherein the processing execution information includes at least one of: a threshold, command information to be a target of discontinuous processing, progress information indicating progress of each processing; and the processing execution information includes a time interval of a plurality of processing determined by the residual capacity of the charge unit and a current value or a voltage value obtained by a non-contact power supply, and
the threshold relates to the residual capacity, the voltage, or the current of the charge unit.

* * * * *